(12) United States Patent
Cooper et al.

(10) Patent No.: US 10,678,199 B2
(45) Date of Patent: Jun. 9, 2020

(54) SYSTEMS, METHODS AND DEVICES FOR STANDBY POWER ENTRY WITHOUT LATENCY TOLERANCE INFORMATION

(71) Applicant: INTEL CORPORATION, Santa Clara, CA (US)

(72) Inventors: Barnes Cooper, Tigard, OR (US); Neil W. Songer, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 15/191,123

(22) Filed: Jun. 23, 2016

(65) Prior Publication Data

US 2017/0371402 A1    Dec. 28, 2017

(51) Int. Cl.

| | |
|---|---|
| G06F 1/32 | (2019.01) |
| G05B 15/02 | (2006.01) |
| G06F 1/3228 | (2019.01) |
| G06F 1/3296 | (2019.01) |
| G06F 9/46 | (2006.01) |
| G06F 1/20 | (2006.01) |
| G06F 11/30 | (2006.01) |
| G06F 1/3234 | (2019.01) |

(52) U.S. Cl.
CPC ............. G05B 15/02 (2013.01); G06F 1/206 (2013.01); G06F 1/3228 (2013.01); G06F 1/3243 (2013.01); G06F 1/3296 (2013.01); G06F 9/46 (2013.01); G06F 11/3062 (2013.01); Y02D 50/20 (2018.01)

(58) Field of Classification Search
None
See application file for complete search history.

(56) References Cited

U.S. PATENT DOCUMENTS

| 8,566,628 | B2 * | 10/2013 | Branover | ............. | G06F 1/3203 713/323 |
|---|---|---|---|---|---|
| 2009/0327774 | A1 * | 12/2009 | Jeyaseelan | ............ | G06F 1/3203 713/320 |
| 2010/0287394 | A1 | 11/2010 | Branover et al. | | |
| 2013/0007494 | A1 | 1/2013 | Branover et al. | | |
| 2015/0052404 | A1 | 2/2015 | Henriques et al. | | |

(Continued)

FOREIGN PATENT DOCUMENTS

EP    2846217 A1    3/2015

OTHER PUBLICATIONS

PCT/US2017/034200, International Search Report and Written Opinion, dated Aug. 30, 2017, 11 pages.

*Primary Examiner* — Fahmida Rahman
(74) *Attorney, Agent, or Firm* — Green, Howard & Mughal LLP

(57) ABSTRACT

Standby power entry can be performed without latency tolerance information. The embodiments disclosed herein enable a power delivery system of a computing system to enter the requested low power state while ignoring any latency tolerance information throughout the platform. For example, an operating system (OS) can request a Forced Cx state (also known as a Forced C state), such as a Forced C10 state, allowing the system to ignore any latency tolerance information throughout the platform. This Forced Cx state can be used as a test mechanism to determine if a problematic device or integrated circuit is blocking entry into the low power state.

24 Claims, 6 Drawing Sheets

(56) References Cited

U.S. PATENT DOCUMENTS

2015/0355705 A1* 12/2015 Weissmann ........... G06F 1/3287
 713/322
2015/0356035 A1 12/2015 Singh et al.

* cited by examiner

SYSTEMS, METHODS AND DEVICES FOR STANDBY POWER ENTRY WITHOUT LATENCY TOLERANCE INFORMATION

TECHNICAL FIELD

The present disclosure relates to power delivery to computing systems and more specifically relates to energy use efficiency in idle systems.

DETAILED DESCRIPTION

Figure 1:
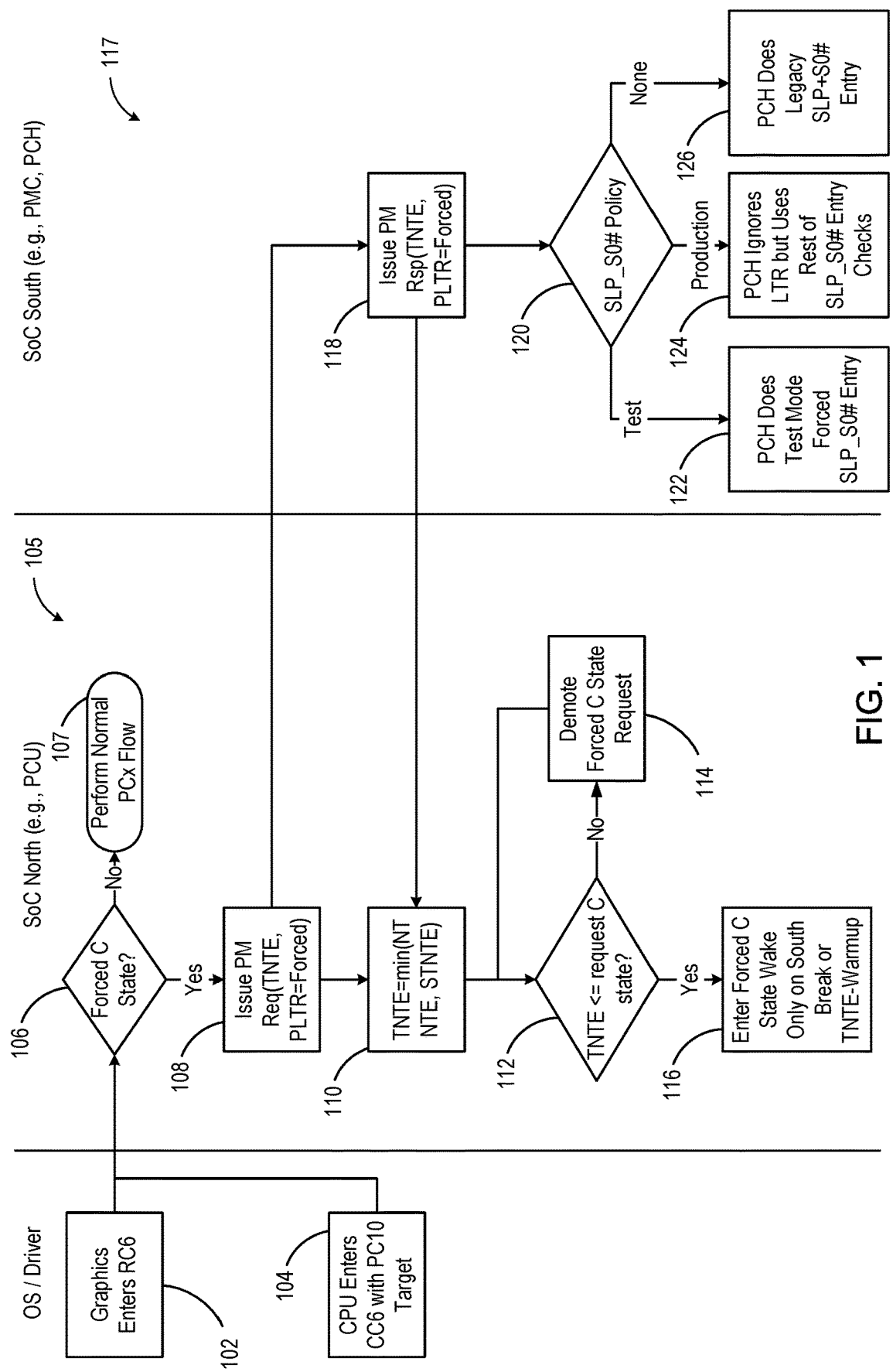
FIG. 1 is a flow chart illustrating a method of implementing a Forced Cx state consistent with at least one of the embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are also disclosed that enable a power delivery system of a computing system to enter the requested low power state while ignoring latency tolerance information throughout the platform. For example, an operating system (OS) can request a Forced Cx state (also known as a Forced C state), such as Forced C10, allowing the system to ignore latency tolerance information throughout the platform and enter a low power state. In some embodiments, the Forced Cx state is used as a test mechanism to determine if a problematic device or integrated circuit is blocking entry into the low power state.

Two types of sleeping state models are supported in modern operating systems. A first sleeping state model is Sx. Sx involves notifying applications and drivers, and then powering off the bulk of the hardware with the memory left in self-refresh. This results in long latency transitions (which can be on the order of seconds) as the basic input output system (BIOS) performs pre-operating system (OS) execution to ready the system for a handoff to the OS. A second sleeping state model is S0ix. In S0ix, the OS dynamically places devices in lower power states (which may, in turn, be powered off the system BIOS and hardware known as runtime D3 (RTD3), and then places the threads/cores in a low power C state. In some embodiments, this low power C state maps to a core C6 (CC6) low power state. The platform can then enter a platform C10 (PC10) state (assuming the devices are inactive and allow for such a state). In this state, a system on a chip (SoC) is capable of achieving low power levels and, at the same time, allows the system to wake much faster than using a Sx-based approach (e.g., under 300 ms versus over 1 sec.).

In some embodiments, a computing system has a framework that provides direct and indirect latency tolerance support throughout the SoC and connected devices so that power management controllers in the SoC (e.g., a north power controller such as a power control unit (PCU) in north and a south power controller such as power management controller (PMC) in south) are aware of the time to the next timer event (TNTE) as well as the minimum platform latency tolerance request (LTR), and can use this information to safely enter low power states on the platform. For example, some power platform systems support deep low power platform S0ix states, which map to deep low power package C states on a SoC (e.g., a platform C10) without any added support from the operating system. However, these power platforms can depend on devices to participate and follow procedures, which may not happen. Power controllers (i.e., power management controllers) can be fixed hardware, programmable logic, embedded controllers, etc.

In an embodiment, the OS provides support for quiescing the system to prepare for and enter S0ix (such as support models that are used by platforms using modern standby OSes). In some embodiments, devices do not adequately generate correct lower power state transitions on their links, or with their mechanism of injecting latency tolerance into the platform (e.g., PCIe LTR message). Some devices may be placed into run time cold (e.g., RTD3) states as part of the device low power-messaging in modern standby OSes such that they are powered off, but potentially inadvertently block the SoC entry into a low power state by not sequencing down to the off state properly.

Computing systems employ latency tolerance systems to support deep low power C states while the system is in S0, and OS-based messaging can place devices safely in platform low power states prior to entering OS-driven S0ix. In some embodiments, a system may enter S0ix through a mechanism, herein referred to as Forced Cx, by entering a requested low power state, sometimes a deepest supported by the SoC (such as Forced C10) while ignoring latency tolerance information throughout the system. In one embodiment, Forced Cx can serve as a test mechanism to determine if any system component is blocking entry into the low power state, and OSVs analysis may test whether the problems it solves are systemic and/or broad in nature. In some embodiments, Forced Cx can allow testing the CPU for C10 functionality even without all the hardware, driver and/or BIOS support for every device in the platform.

Throughout this disclosure, a hyphenated form of a reference numeral refers to a specific instance of an element, and the unhyphenated form of the reference numeral refers to the element generically or collectively. Thus, widget 12-1 refers to an instance of a widget class, which may be referred to collectively as widgets 12, and any one of which may be referred to generically as a widget 12.

FIG. 1 is a flow chart illustrating a method of implementing a Forced Cx state (also known as a forced low power C state). In the embodiment shown, the operating system (OS) communicates low power states of a graphics system and a CPU of a system on a chip (SoC) to a SoC North 105 of the computing system along with a request for a Forced Cx state transition. The SoC North 105 communicates with a SoC South 117 of the computing system to facilitate the Forced Cx state transition and a wake-up time requested by the operating system. Based on the Forced Cx state request, the SoC South 117 transitions to a low power state without honoring latency tolerance requests (LTR) unless configured to use a legacy policy that overrides the Forced Cx state request.

Functions of the SoC North 105 and SoC South 117 can be performed by processors. The SoC North processor can be a power control unit (PCU). The SoC South processor can be a power management controller (PMC) of a platform controller hub (PCH).

For example, in the OS/Driver region of a platform, a graphics system enters a runtime C6 (RC6) low power state in block 102, and a CPU (also known as Intel® architecture, or IA) enters a core C6 (CC6) low power state with a target of reaching a platform C10 (PC10) low power state in block 104. The OS sends a request to the SoC North 105 power control unit (PCU) for a low power C state. If the SoC North 105 determines that the OS has not requested a Forced Cx state in block 106, the system follows a normal PCx flow 107.

If the SoC North 105 determines that the OS has requested a Forced Cx state in block 106, the SoC North 105 generates a power management request (PMReq) in block 108 containing the time to next timer event (TNTE) for north and the platform latency requirement (PLTR) flag for a Forced Cx state. The SoC North 105 sends this PMReq to the SoC South (PMC, PCH) 117. The SoC South 117 issues a power management response (PMRsp or Rsp) containing the TNTE for south and a PLTR flag for the Forced Cx state in block 118 and returns this TNTE to the SoC North 105. The SoC North 105 identifies the system TNTE as the lesser of the north TNTE (NTNTE) and the south TNTE (STNTE) in block 110. The SoC North 105 compares the TNTE for the system to the requested Forced Cx state in block 112. If the TNTE for the system is less than or equal to the time to execute the requested Forced Cx state in block 112, the system enters the requested Forced Cx state and wakes on a break from the south or following an interval which is the TNTE less warmup time in block 116. However, if the SoC North 105 determines the TNTE is greater than the time to execute the requested Forced Cx state in block 112, the SoC North 105 demotes the Forced Cx state request in block 114.

When the SoC South 117 issues a PMRsp in block 118, the SoC South 117 evaluates the sleep state policy (SLP_S0# policy) in block 120. If the sleep state policy is a test mode in block 120, the SoC South 117 ignores LTR and at least some SLP_S0# entry checks, and then enters the requested Forced Cx state in block 122. If the sleep state policy is a production mode in block 120, the SoC South 117 ignores LTR and performs SLP_S0# entry checks, and enters the requested Forced Cx state in block 124. If there is no sleep state policy or a sleep state policy is not selected in block 120, the SoC South 117 performs a legacy SLP_S0# entry and then enters a low power C state in block 126.

Figure 2:
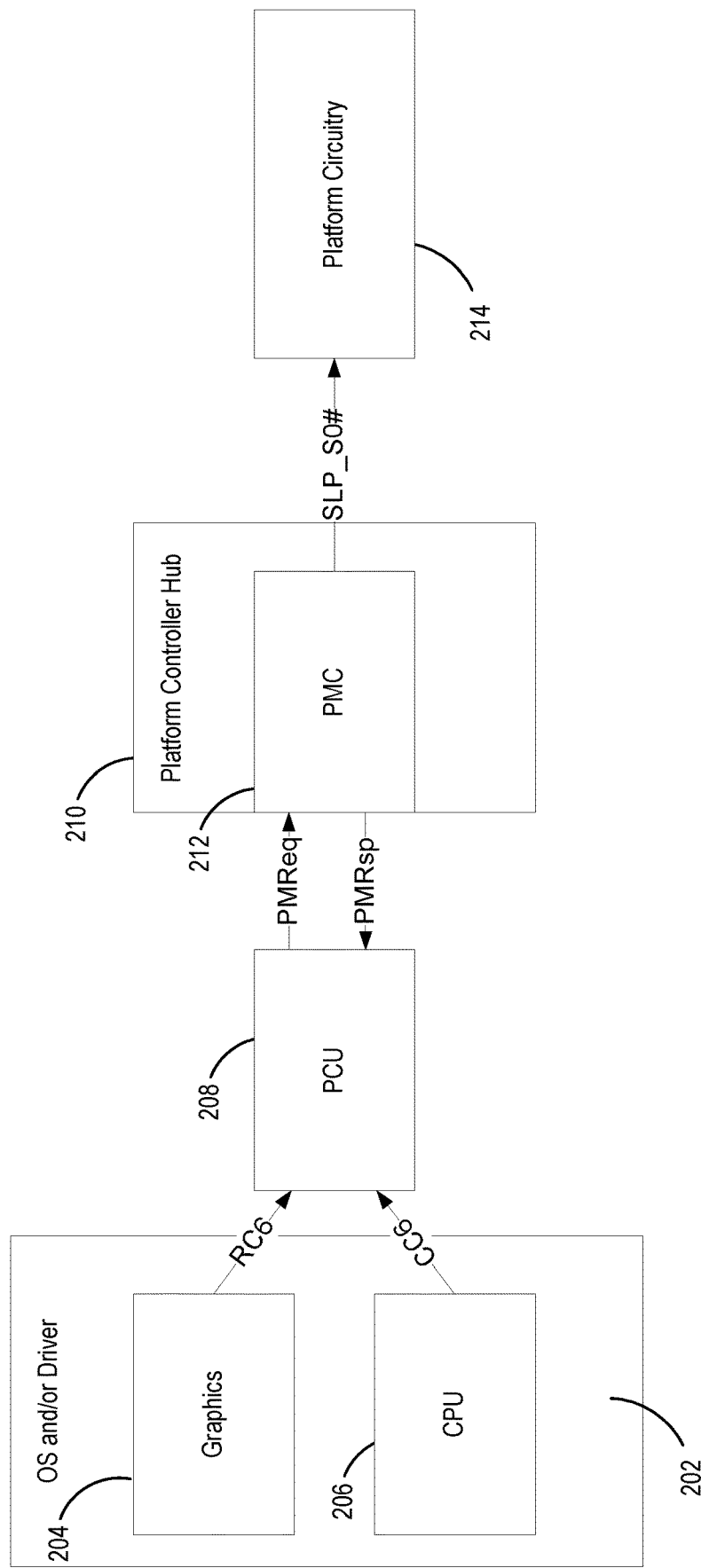
FIG. 2 is a system diagram of a computing system implementing a Forced Cx state consistent with at least one of the embodiments disclosed herein.

FIG. 2 is a system diagram of a computing system implementing a Forced Cx state consistent with the embodiments disclosed herein. In the embodiment shown, the operating system (OS) and/or relevant hardware driver(s) 202 communicates a graphics subsystem 204 runtime C6 (RC6) low power state and a core C6 (CC6) low power state of a CPU 206 of a SoC to a PCU 208 of the computing system. The PCU 208 communicates to a PMC 212 on a platform controller hub 210 of the computing system via a power management request (PMReq). The PMC 212 communicates to the PCU 208 via a power management response (PMRsp), and communicates to a platform circuitry 214 according to the entries of the platform's sleep state policy, if any. The PMC 212 can then assert the SLP_S0# signal to cause the platform circuitry 214 to transition to a low power state.

Forced Cx can include attributes as compared with traditional or Normal Cx. Normal Cx can honor TNTE with pre-warm and bounds latency by minimum PLTR. Forced Cx honors TNTE with pre-warm and ignores PLTR. In one embodiment, the Forced Cx field can be enumerated through the CPUID MWAIT leaf 05h, and a platform indicator may also be provided through advanced configuration and power interface (ACPI).

In some embodiments, messaging is managed using the PMReq, Rsp, Dmd messages through on package input/output (OPIO) or direct media interface (DMI) between north and south. A Snoop Latency Value in PMReq (from PMC to PCU) can be set to disabled (all 0s) to signal that the OS has requested Forced Cx10.

In one embodiment, the platform controller hub (PCH) can perform specific actions when latency tolerance is high enough. Additional PCH characterization may be performed (e.g., dependence on clocking and PLL state) to reach a low power optimized state determined through the assertion of the SLP_S0#. In an embodiment of a Forced Cx state, the PCH ignores latency tolerance, but performs the other checks to ensure correct operation in this state with the assertion of SLP_S0#. Forced Cx may facilitate validation of SLP_S0# logic in PCH prior to implementation of the hardware, driver and/or BIOS support for devices in the platform.

Figure 3:
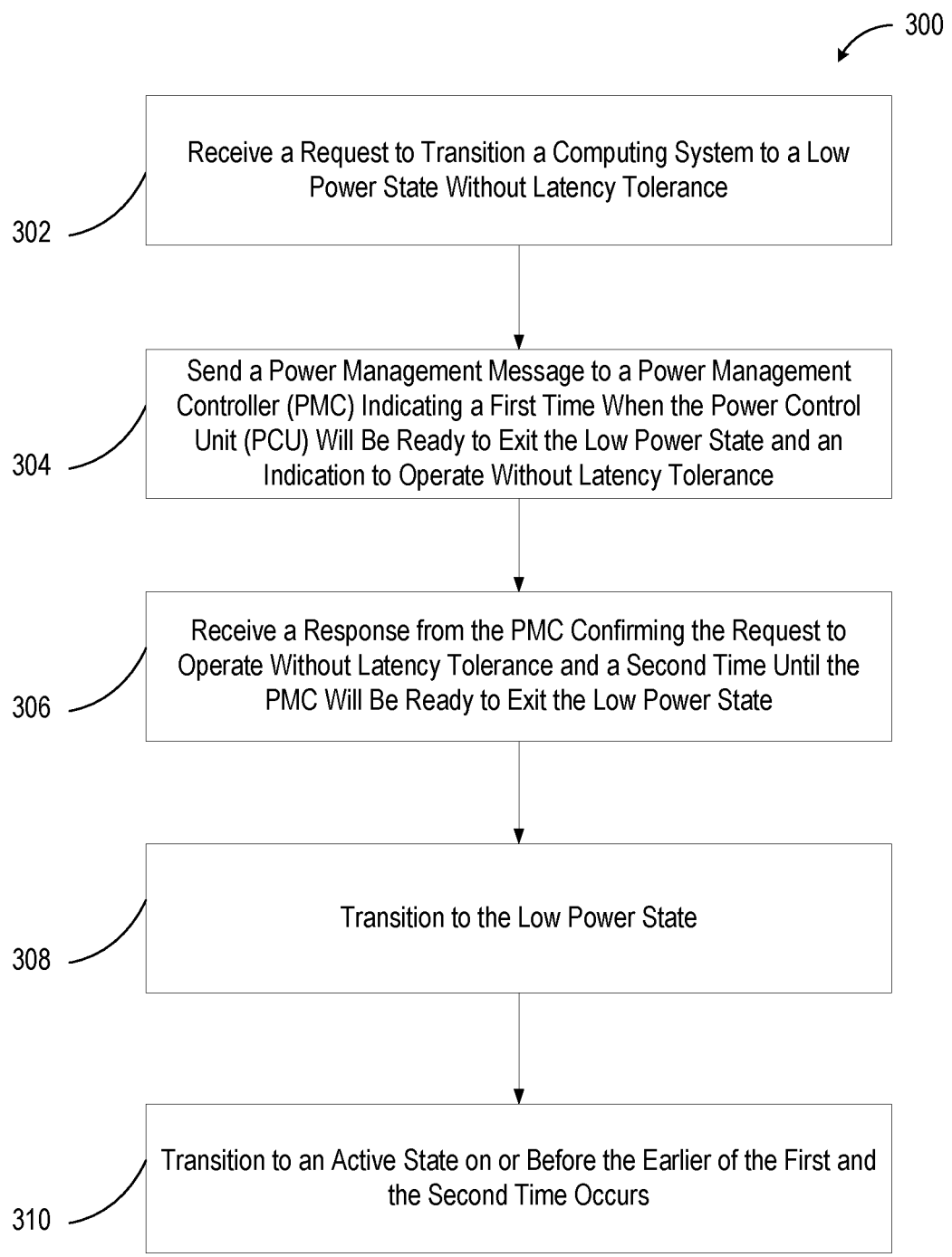
FIG. 3 illustrates a method of implementing a Forced Cx low power state in a computing system consistent with at least one of the embodiments disclosed herein.

FIG. 3 illustrates a method 300 of implementing a Forced Cx low power state in a computing system. The method 300 can be accomplished by systems including the systems shown in FIGS. 2 and 4-6, including a power control unit 424 and an operating system interface 426. In block 302, the PCU receives a request to transition the system to a low power state without latency tolerance. In block 304, the PCU sends a power management message to the power management controller (PMC) indicating a first time when the PCU will be ready to exit the low power state, and an indication to operate without latency tolerance. In block 306, the PCU receives a power management message from the PMC acknowledging the request to operate without latency tolerance, and a second time when the PMC will be ready to exit the low power state. In block 308, the system transitions to a low power state. In block 310, the system transitions to an active state on or before occurrence of the earlier of the first time (from block 304) or second time (from block 306).

Figure 4:
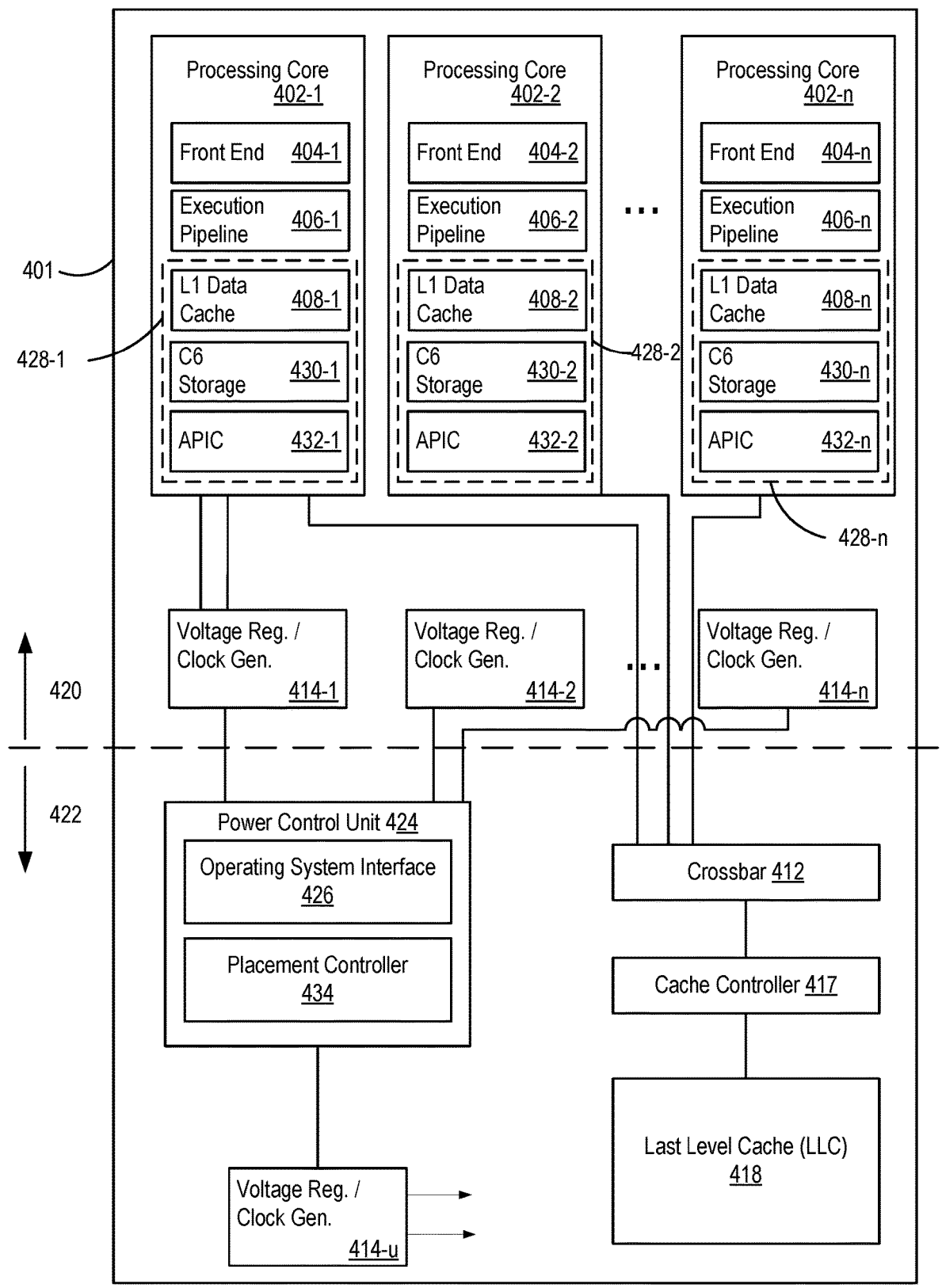
FIG. 4 illustrates a multicore processor used in conjunction with at least one of the embodiments disclosed herein.

FIG. 4 illustrates a multicore processor used in conjunction with at least one embodiment. In at least one embodiment, a processor 401 includes a core region 420 and an uncore 422. In some embodiments, the core region 420 includes multiple processing cores 402, but disclosed functionality may be applicable to single core processors in a multi-processor system. In some embodiments, the processor 401 includes a first processing core 402-1, a second processing core 402-2, and so forth through an n-th processing core 402-*n*.

In some embodiments, the processing cores 402 include sub-elements or clusters that provide different aspects of overall functionality. In some embodiments, the processing cores 402 include a front end 404, an execution pipeline 406, and a core periphery 428. The core periphery 428 can include a first level (L1) data cache 408, a C6 storage 430 and an advanced programmable interrupt controller (APIC)

432. In at least one embodiment, the front end 404 is operable to fetch instructions from an instruction cache (not depicted) and schedule the fetched instructions for execution. In some embodiments, the execution pipeline 406 decodes and performs various mathematical, logical, memory access and flow control instructions in conjunction with a register file (not depicted) and the L1 data cache 408. Thus, in some embodiments, the front end 404 may be responsible for ensuring that a steady stream of instructions is fed to the execution pipeline 406 while the execution pipeline 406 may be responsible for executing instructions and processing the results. In some embodiments, the execution pipeline 406 may include two or more arithmetic pipelines in parallel, two or more memory access or load/store pipelines in parallel, and two or more flow control or branch pipelines. In at least one embodiment, the execution pipelines 406 may further include one or more floating point pipelines. In some embodiments, the execution pipelines 406 may include register and logical resources for executing instructions out of order, executing instructions speculatively, or both. A hyperthread core is a core that is capable of execution of two or more instructions in parallel. Each execution pipeline 406 of a core is called a hyperthread. A hyperthread can be exposed to an operating system as a logical core.

The core periphery 428 can include logic that supports the front end 404 and the execution pipeline 406, including managing storage and interrupts. The core periphery 428 can include the L1 data cache 408, the C6 storage 430 and the advanced programmable interrupt controller (APIC) 432. The C6 storage 430 can store a context (or state) of the processing core 402 when the processing core 402 transitions into a low power state (such as a C6 state). A peripheral controller (e.g., the APIC 432) can manage interrupts for the processing core 402, including identifying which interrupts apply to the associated processing core 402 and managing an APIC ID which can be used to identify an associated core.

In at least one embodiment, during execution of memory access instructions, the execution pipeline 406 attempts to execute the instructions by accessing a copy of the applicable memory address residing in the lowest-level cache memory of a cache memory subsystem that may include two or more cache memories arranged in a hierarchical configuration. In at least one embodiment, a cache memory subsystem includes the L1 data caches 408 and a last level cache (LLC) 418 in the uncore 422. In at least one embodiment, other elements of the cache memory subsystem may include a per-core instruction cache (not depicted) that operates in conjunction with the front end 404 and one or more per-core intermediate caches (not depicted). In at least one embodiment, the cache memory subsystem for the processor 401 includes L1 data and instruction caches per core, an intermediate or L2 cache memory per core that includes both instructions and data, and the LLC 418, which includes instructions and data and is shared among multiple processing cores 402. In some embodiments, if a memory access instruction misses in the L1 data cache 408, execution of the applicable program or thread may stall or slow while the cache memory subsystem accesses the various cache memories until a copy of the applicable memory address is found.

In at least one embodiment, the processor 401, the first processing core 402-1, the second processing core 402-2 and the processing core 402-n communicate via a crossbar 412, which may support data queuing, point-to-point protocols and multicore interfacing. Other embodiments of the processor 401 may employ a shared bus interconnect or direct core-to-core interconnections and protocols. In at least one embodiment, the crossbar 412 serves as an uncore controller that interconnects the processing cores 402 with the LLC 418. In some embodiments, the uncore 422 includes a cache controller 417 to implement a cache coherency policy and, in conjunction with a memory controller (not depicted), maintain coherency between a system memory (not depicted) and the various cache memories.

In at least one embodiment, a power control unit (PCU) 424 includes a placement controller 434. The placement controller 434 can monitor workloads of the processing cores 402 and determine which work can be moved to a different core to increase efficiency. Efficiency can be measured in thermal output, power use and/or work accomplished. For example, efficiency can be increased by moving threads between cores that differ due to in-die variation (lower thermal output, decreased power usage, lifetime use management or more work performed). Efficiency can be increased by maintaining a low-voltage operation of a core by not providing a workload above a threshold (i.e., moving threads between cores to prevent a core from operating above a threshold, which is also known as "stressing" a core). Efficiency can be increased by combining multiple threads upon a single hyperthreading core, which saves power of a multi-core overhead. Efficiency can be increased by placing threads on cores that are physically separated to enable a larger spread of heat on the processor die. Efficiency can be increased by spreading heat by moving threads from physical processor to physical processor in sequence to heat different parts of a processor die. Efficiency can be increased by using cores with failed arithmetic units when instructions will not use the arithmetic units, and/or migrating threads between cores when the instructions will use the failed arithmetic units. Efficiency can be increased by performing load balancing for lifetime use management and/or thermal management.

In some embodiments, as a core is used and/or used to perform a large workload, the efficiency of the core decreases. The efficiency decrease can be due to a larger operating voltage and/or a larger thermal output. In some embodiments, a lifetime use of cores can be managed, and workloads transitioned between cores to spread the lifetime usage of cores. In one embodiment, the processor can report a lower core count than actually available on the processor. The workload can be spread among cores to increase the overall lifetime and efficiency of the cores beyond what would be possible without the extra unreported cores. In some embodiments, threads can be transitioned off of a core to sequester the core. The sequestered core can be tested and/or determine performance characteristics of the core. In one embodiment, core sequestering can be used in conjunction with virtual machine manager solutions. In other embodiments, a sequestered core can be used to support other dedicated-purpose, hidden execution arrangements.

In some embodiments, the hardware PCU 424 can decide thread placement among the core and hyperthread resources available. Logical processors can be enumerated to the OS. However, the number of logical processors can be less than a number of physical cores and/or hyperthreads that exist in the processor (i.e., there can be more processor resources than are enumerated to the OS). The OS places work on the logical processors visible to it, and the processor (e.g., the PCU 424) may at a later time migrate a thread to a different resource. For example, the PCU 424 can initiate a sequence that saves the core's context, restores the context to a different core, and redirects a local APIC ID of the previous core to the new core. This migration can occur at the core or thread level. Alternatively, the hardware can provide migration hints to the OS through an operating system interface 426, and the OS can move the work from one core or thread to another.

In at least one embodiment, the core region 420 includes, in addition to the processing cores 402, voltage regulator/clock generator (VRCG) circuits 414 for each core processor 402. In some embodiments, in conjunction with per-core supply voltage signals and clock frequency signals generated by the PCU 424 and provided to each processing core 402, the VRCG circuits 414 support per-core power states by applying a power state indicated by the applicable supply voltage signal and clock frequency signal to the applicable processing core 402, as well as to the uncore 422.

In some embodiments, the PCU 424 is further operable to select processing cores 402 for execution of specific threads and to migrate a thread and its corresponding performance objective or context information from a first core (e.g., the first processing core 402-1) to a second core (e.g., the second processing core 402-2), when the performance characteristics of the second processing core 402-2 make the second processing core 402-2 better suited to achieve a desired efficiency objective than the first processing core 402-1. See, e.g., FIGS. 2 and 3 for a more detailed description of migration.

In some embodiments, the processor 401 may include a hybrid assortment of cores including, in addition to the processing cores 402, graphics cores and other types of core logic. In these hybrid core embodiments, the PCU 424 determines an optimal or desirable power state, not only for the processing cores 402, but also for these other types of core elements in the core region 420. Similarly, in at least one embodiment, the processor 401 includes a VRCG circuit 414-u that provides the power state for the uncore 422 and, in this embodiment, the PCU 424 may determine the optimal or preferred power states for the uncore 422. In some embodiments, the processor 401 supports individualized power states for each processing core 402, any other types of cores in the core region 420, and the uncore 422. Other embodiments may support one power state for the entire core region 420 and one power state for the uncore 422.

The PCU 424 can also include the operating system interface 426. In some embodiments, the PCU 424 can provide recommendations for work placement or migration to an operating system through the operating system interface 426. The operating system can then perform the thread migration between cores. For example, an operating system may not have enough information to recognize that two logical processors are actually associated with one hyperthread core. The PCU 424 can recommend to the operating system that two threads be consolidated on the two logical processors, which can eliminate multi-core overhead.

Figure 5:
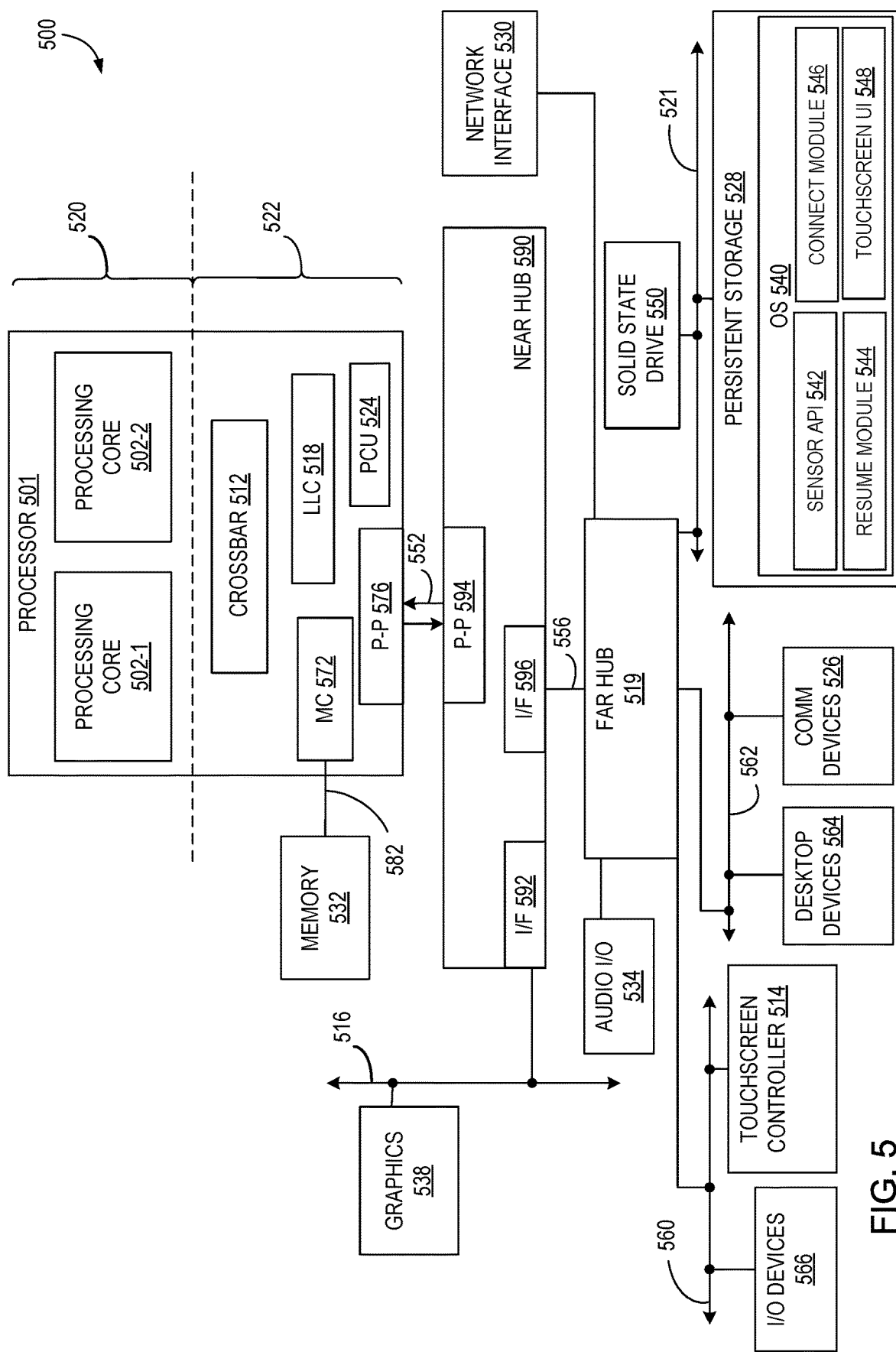
FIG. 5 illustrates a computer system used in conjunction with at least one of the embodiments disclosed herein.

Embodiments may be implemented in many different platforms. FIG. 5 illustrates a computer system 500 used in conjunction with at least one embodiment. In at least one embodiment, a processor, memory, and input/output devices of a processor system are interconnected by a number of point-to-point (P-P) interfaces, as will be described in further detail. However, in other embodiments, the processor system may employ different bus architectures, such as a front side bus, a multi-drop bus, and/or another implementation. Although a processor is shown in FIG. 5 for descriptive clarity, in various embodiments, a different number of processors may be employed using elements of the illustrated architecture.

In at least one embodiment, the system 500 is a point-to-point interconnect system and includes a processor 501. While in some embodiments the system 500 may include only a single processor, in other embodiments, the system 500 may support multiple processors. In at least one embodiment, the processor 501 is a multicore processor including a first processing core 502-1 and a second processing core 502-2. It is noted that other elements of the processor 501 besides the processing cores 502 may be referred to as an uncore 522, while the processing cores 502 may also be referred to as a core region 520. In different embodiments, a varying number of cores may be present in a particular processor. In at least one embodiment, the processing cores 502 may comprise a number of sub-elements (not shown in FIG. 5), also referred to as clusters, that provide different aspects of overall functionality. The processing cores 502 may, in some embodiments, each include a memory cluster (not shown in FIG. 5) that may comprise one or more levels of cache memory. In some embodiments, other clusters (not shown in FIG. 5) in the processing cores 502 may include a front-end cluster and an execution pipeline cluster. In at least one embodiment, the processing cores 502 may include an L1 data cache. In some embodiments, the uncore 522 may include a crossbar 512, an LLC 518, a memory controller (MC) 572, a PCU 524 and a P-P interface 576. In some embodiments, the PCU 524 may be used to select a specific core based on the individual characteristics of each core on the die and the constraints of the task.

In particular embodiments, the processing cores 502 within the processor 501 are not equipped with direct means of communicating with each other, but rather, communicate via the crossbar 512, which may include intelligent functionality such as cache control, data queuing, P-P protocols, and multicore interfacing. In some embodiments, the crossbar 512 may thus represent an intelligent uncore controller that interconnects the processing cores 502 with the MC 572, the LLC 518, and the P-P interface 576, among other elements. In particular, to improve performance in such an architecture, cache controller functionality within the crossbar 512 may, in some embodiments, enable selective caching of data within a cache hierarchy including the LLC 518 and one or more caches present in the processing cores 502. In at least one embodiment, the crossbar 512 is referred to as a global queue.

In at least one embodiment, the LLC 518 may be coupled to a pair of the processing cores 502, respectively. In some embodiments, the LLC 518 may be shared by the first processing core 502-1 and the second processing core 502-2. In some embodiments, the LLC 518 may be fully shared such that any single one of the processing cores 502 may fill or access the full storage capacity of the LLC 518. Additionally, in some embodiments, the MC 572 may provide for direct access by the processor 501 to a memory 532 via a memory interface 582. In some embodiments, the memory 532 may be a double-data rate (DDR) type dynamic random-access memory (DRAM), while the memory interface 582 and the MC 572 comply with a DDR interface specification. In at least one embodiment, the memory 532 may represent a bank of memory interfaces (or slots) that may be populated with corresponding memory circuits for a desired DRAM capacity.

In some embodiments, the processor 501 may also communicate with other elements of the system 500, such as a near hub 590 and a far hub 519, which are also collectively referred to as a chipset that supports the processor 501. In at least one embodiment, the P-P interface 576 may be used by the processor 501 to communicate with the near hub 590 via an interconnect link 552. In certain embodiments, the P-P interfaces 576, 594 and the interconnect link 552 are implemented using Intel QuickPath Interconnect architecture. In at least one embodiment, the near hub 590 includes an interface 592 to couple the near hub 590 with a first bus 516, which may support high-performance I/O with corresponding bus devices, such as graphics 538 and/or other bus devices. In some embodiments, the graphics 538 may represent a high-performance graphics engine that outputs to a display device (not shown in FIG. 5). In at least one embodiment, the first bus 516 is a Peripheral Component Interconnect (PCI) bus, such as a PCI Express (PCIe) bus and/or another computer expansion bus. In some embodiments, the near hub 590 may also be coupled to the far hub 519 at an interface 596 via an interconnect link 556. In certain embodiments, the interface 596 is referred to as a south bridge. The far hub 519 may, in some embodiments, provide I/O interconnections for various computer system peripheral devices and interfaces, and may provide backward compatibility with legacy computer system peripheral devices and interfaces. Thus, in at least one embodiment, the far hub 519 provides a network interface 530 and an audio I/O 534, as well as interfaces to a second bus 560, a third bus 562, and a fourth bus 521, as will be described in further detail.

In some embodiments, the second bus 560 may support expanded functionality for the system 500 with I/O devices 566 and a touchscreen controller 514, and may be a PCI-type computer bus. In at least one embodiment, the third bus 562 may be a peripheral bus for end-user consumer devices, represented by desktop devices 564 and communication devices 526, which may include various types of keyboards, computer mice, communication devices, data storage devices, bus expansion devices, etc. In certain embodiments, the third bus 562 represents a Universal Serial Bus (USB) or similar peripheral interconnect bus. In some embodiments, the fourth bus 521 may represent a computer interface bus for connecting mass storage devices, such as hard disk drives, optical drives, and disk arrays, which are generically represented by a persistent storage 528 that may be executable by the processor 501.

In at least one embodiment, the system 500 incorporates various features that facilitate a handheld or tablet type of operation and other features that facilitate laptop or desktop operation. In addition, in some embodiments, the system 500 includes features that cooperate to aggressively conserve power while simultaneously reducing latency associated with traditional power conservation performance objectives.

In at least one embodiment, the system 500 includes an operating system 540 that may be entirely or partially stored in the persistent storage 528. In some embodiments, the operating system 540 may include various modules, application programming interfaces, and the like that expose to varying degrees various hardware and software features of the system 500. In at least one embodiment, the system 500 includes a sensor application programming interface (API) 542, a resume module 544, a connect module 546, and a touchscreen user interface 548. In some embodiments, the system 500 may further include various hardware/firmware features including the capacitive or resistive touchscreen controller 514 and a second source of persistent storage such as a solid state drive (SSD) 550.

In some embodiments, the sensor API 542 provides application program access to one or more sensors (not depicted) that may be included in the system 500. Sensors that the system 500 might have in some embodiments an accelerometer, a global positioning system (GPS) device, a gyrometer, an inclinometer, and a light sensor. The resume module 544 may, in some embodiments, be implemented as software that, when executed, performs operations for reducing latency when transitioning the system 500 from a power conservation performance objective to an operating performance objective. In at least one embodiment, the resume module 544 may work in conjunction with the SSD 550 to reduce the amount of SSD storage used when the system 500 enters a power conservation mode. The resume module 544 may, in some embodiments, flush standby and temporary memory pages before transitioning to a sleep mode. In some embodiments, by reducing the amount of system memory space that the system 500 uses to preserve upon entering a low power state, the resume module 544 beneficially reduces the amount of time used to perform the transition from the low power state to an operating performance objective. In at least one embodiment, the connect module 546 may include software instructions that, when executed, perform complementary functions for conserving power while reducing the amount of latency or delay associated with traditional "wake-up" sequences. The connect module 546 may, in some embodiments, periodically update certain "dynamic" applications including email and social network applications, so that, when the system 500 wakes from a low-power mode, the applications that are often most likely to refresh are up-to-date. In at least one embodiment, the touchscreen user interface 548 supports the touchscreen controller 514 that enables user input via touchscreens traditionally reserved for handheld applications. In some embodiments, the inclusion of touchscreen support in conjunction with support for the communication devices 526 enables the system 500 to provide features traditionally found in dedicated tablet devices as well as features found in dedicated laptop and desktop systems.

Figure 6:
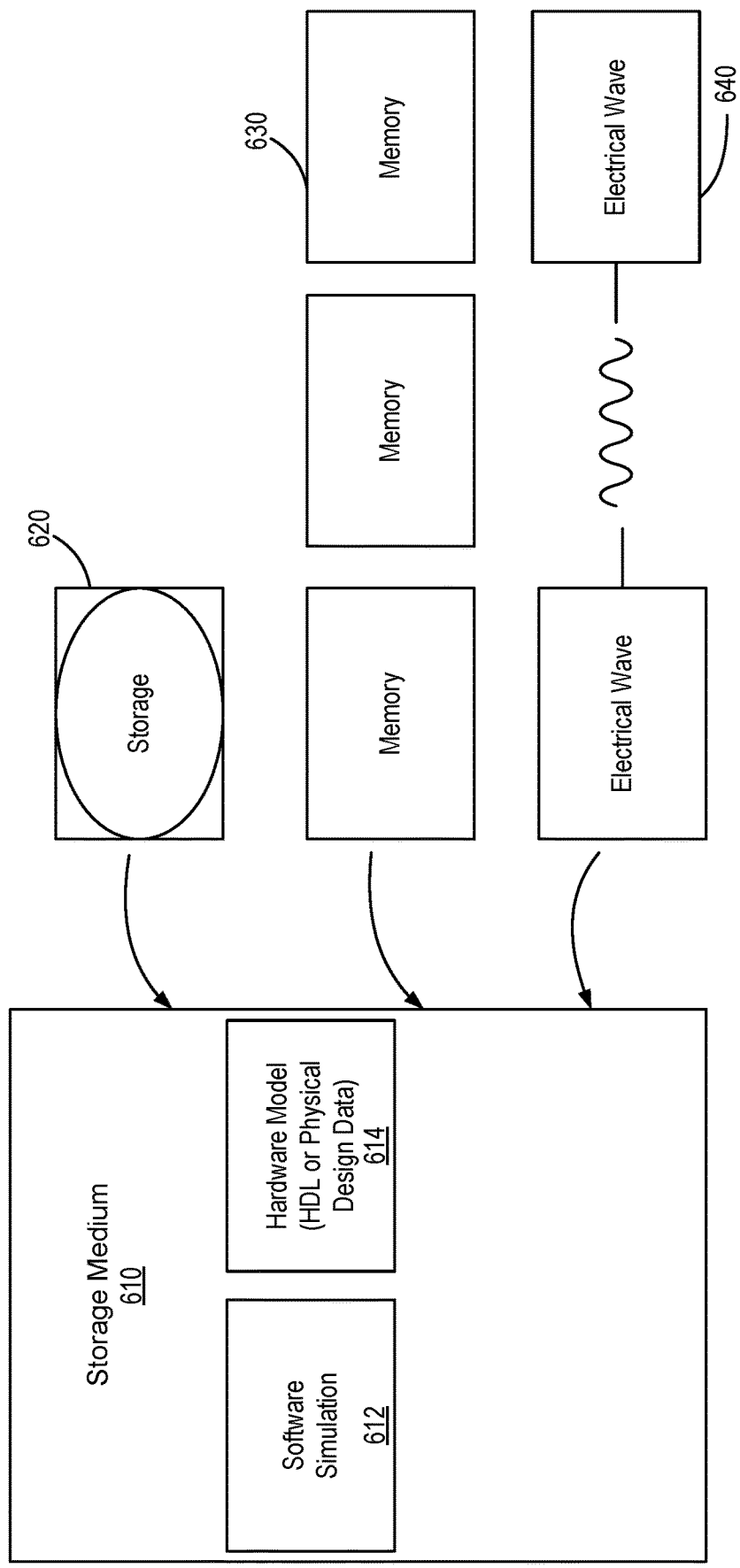
FIG. 6 illustrates a representation for simulation, emulation, and fabrication of a design implementing the embodiments disclosed herein.

FIG. 6 illustrates a representation for simulation, emulation, and fabrication of a design implementing the disclosed techniques. Data representing a design may represent the design in a number of manners. First, as is useful in simulations, the hardware may be represented using a hardware description language or another functional description language which basically provides a computerized model of how the designed hardware is expected to perform. In at least one embodiment, a hardware model 614 may be stored in a storage medium 610 such as a computer memory so that the hardware model 614 may be simulated using simulation software 612 that applies a particular test suite to the hardware model 614 to determine if it indeed functions as intended. In some embodiments, the simulation software 612 is not recorded, captured or contained in the storage medium 610.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, reconfigurable hardware is another embodiment that may involve a tangible machine-readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine-readable medium. In some embodiments, an optical or electrical wave 640 modulated or otherwise generated to transmit such information, a memory 630, or a magnetic or optical storage 620 such as a disc may be the tangible machine-readable medium. Any of these mediums may "carry" the design information. The term "carry" (e.g., a tangible machine-readable medium carrying information) thus covers information stored on a storage device or information encoded or modulated into or onto a carrier wave. The set of bits describing the design or the particular part of the design is (when embodied in a machine-readable medium such as a carrier or storage medium) an article that may be sold in and of itself or used by others for further design or fabrication.

EXAMPLES

The following examples pertain to further embodiments.

Example 1 is a north power controller for transitioning to a low power state. The north power controller includes a processor. The processor is designed to receive a request to transition a computing system to the low power state without latency tolerance. The processor is also designed to send a power management message to a south power controller indicating a first time when the north power controller will be ready to exit the low power state and an indication to operate without latency tolerance. The processor is further designed to receive a response from the south power controller confirming the request to operate without latency tolerance and a second time until the south power controller will be ready to exit the low power state. The processor is also designed to transition to the low power state and transition to an active state on or before the earlier of the first time and the second time occurs.

Example 2 is the subject matter of Example 1, or any of the Examples described herein, where the north power controller is a power control unit (PCU) and the south power controller is a power management controller (PMC).

Example 3 is the subject matter of Example 1, or any of the Examples described herein, where the north power controller is fixed hardware, programmable logic, or an embedded controller.

Example 4 is the subject matter of Example 1, or any of the Examples described herein, where the south power controller is fixed hardware, programmable logic, or an embedded controller.

In Example 5, the subject matter of Example 1, or any of the Examples described herein, may further include a graphics interface and a central processing unit (CPU) interface, or both interfaces designed to provide power state information to the north power controller.

In Example 6 the subject matter of Example 1, or any of the Examples described herein may further include an operating system interface designed to provide power state information to the north power controller.

Example 7 is the subject matter of Example 1, or any of the Examples described herein, where the north power controller is part of a north bridge and the south power controller is part of a south bridge.

Example 8 is the subject matter of any of Examples 1-7, or any of the Examples described herein, where the request is from an operating system.

Example 9 is the subject matter of any of Examples 1-7, or any of the Examples described herein, where the low power state is a C10 state.

Example 10 is the subject matter of any of Examples 1-7, or any of the Examples described herein, where the latency tolerance is a platform latency tolerance request (PLTR).

Example 11 is the subject matter of any of Examples 1-7, or any of the Examples described herein, where the low power state includes a platform S0ix state.

Example 12 is the subject matter of any of Examples 1-7, or any of the Examples described herein, where the low power state includes a package C10 state.

Example 13 is an apparatus of a south power controller. The apparatus includes a processor. The processor is designed to receive a power management message from a north power controller indicating a first time when the north power controller will exit a low power state and an indication to operate without latency tolerance. The processor is also designed to generate a response to the north power controller confirming the request to operate without latency tolerance and a second time when the south power controller will exit the low power state, assert a SLP_S0# signal, and transition to the low power state.

Example 14 is the subject matter of Example 13, or any of the Examples described herein, where the first time is a time to next timer event (TNTE).

Example 15 is the subject matter of Example 13, or any of the Examples described herein, where the power management message is a power management request (PMReq) message, Rsp message, Dmd message on package I/O (OPIO), or direct media interface (DMI) message.

Example 16 is subject matter of Example 13, or any of the Examples described herein, where the indication to operate without latency tolerance further includes a snoop latency value in a power management request (PMReq) message being set to value representing disabled.

Example 17 is the subject matter of Example 13, or any of the Examples described herein, where to assert a SLP_S0# signal further includes causing a voltage of a SLP_S0# pin of a processor package to be set.

Example 18 is the subject matter of Example 13, or any of the Examples described herein, where the north power controller is part of a north bridge and the south power controller is part of a south bridge.

Example 19 is the subject matter of any of Examples 13-18, or any of the Examples described, herein where to assert a SLP_S0# signal further includes using test mode forced SLP_S0# entry checks when a test SLP_S0# policy is selected.

Example 20 is the subject matter of any of Examples 13-18, or any of the Examples described herein, where to assert a SLP_S0# signal further includes using SLP_S0# entry checks while ignoring latency tolerance requests when a production SLP_S0# policy is selected.

Example 21 is the subject matter of any of Examples 13-18, or any of the Examples described herein, where to assert a SLP_S0# signal further includes using legacy SLP_S0# entry checks when no SLP_S0# policy is selected.

Example 22 is a computer program product. The computer program product contains a computer-readable storage medium. The computer-readable storage medium stores instructions for execution by a processor to perform power management operations of a system on a chip (SoC). When executed by the processor, the operations perform a method. The method includes receiving a request to transition the SoC to a low power state with an indicator to ignore latency tolerance, and sending a power management message to a south power controller indicating a first time when the north power controller will be ready for the low power state and an indication to operate without latency tolerance. The method further includes receiving a response from the south power controller confirming the request to operate without latency tolerance and a second time until the south power controller will be ready for the low power state, and transitioning to the low power state on or after a later of the first and the second time occurs.

Example 23 is the subject matter of Example 22, or any of the Examples described herein, where the method further includes receiving the power management message from a north power controller indicating the first time when the north power controller will be ready for the low power state and the indication to operate without latency tolerance. The method further includes generating a response to the north power controller confirming the request to operate without latency tolerance and the second time until the south power controller will be ready for the low power state; asserting a SLP_S0# signal and transitioning to the low power state on or after the later of the first and the second time occurs.

Example 24 is the subject matter of Example 23, or any of the Examples described herein, where the north power controller is part of a north bridge and the south power controller is part of a south bridge.

Example 25 is the subject matter of Example 23, or any of the Examples described herein, where the method further includes receiving an indication of a low power state from a graphics interface and a central processing unit (CPU) interface.

Example 26 is the subject matter of Example 22, or any of the Examples described herein, may further include a method to receive an indication of power state information from an operating system interface, where the operating system interface is designed to provide power state information to the north power controller.

Example 27 is an apparatus for transitioning to a low power state. The apparatus includes a procedure for receiving a request to transition a computing system to the low power state without latency tolerance, and a procedure for sending a power management message to a south power controller indicating a first time when a north power controller will be ready for the low power state and an indication to operate without latency tolerance. The apparatus further includes a procedure for receiving a response from the south power controller confirming the request to operate without latency tolerance and a second time until the south power controller will be ready for the low power state, and a procedure for transitioning to the low power state on or after a later of the first and the second time occurs.

Example 28 is the subject matter of Example 27, or any of the Examples described herein, may further include a procedure for receiving an indication of power state information from an operating system interface, where the operating system interface is designed to provide power state information to the north power controller.

Example 29 is a method of transitioning to a low power state. The method includes receiving a request to transition a computing system to the low power state without latency tolerance, and sending a power management message to a south power controller indicating a first time when the power control unit (PCU) will be ready for the low power state and an indication to operate without latency tolerance. The method further includes receiving a response from the south power controller confirming the request to operate without latency tolerance and a second time until the south power controller will be ready for the low power state, and transitioning to the low power state on or after a later of the first and the second time occurs.

Example 30 is a method for transitioning to a low power state. The method includes receiving a power management message from a north power controller indicating a first time when the north power controller will be ready for the low power state and an indication to operate without latency tolerance. The method further includes generating a response to the north power controller confirming the request to operate without latency tolerance and a second time until the south power controller will be ready for the low power state, and asserting a SLP_S0# signal and transitioning to the low power state on or after a later of the first and the second time occurs.

Example 31 is the subject matter of Example 30, or any of the Examples described herein, where asserting the SLP_S0# signal further includes using test mode forced SLP_S0# entry checks when a test SLP_S0# policy is selected.

Example 32 is the subject matter of Example 30, or any of the Examples described herein, where asserting the SLP_S0# signal further includes using SLP_S0# entry checks while ignoring latency tolerance requests when a production SLP_S0# policy is selected.

Example 33 is the subject matter of Example 30, or any of the Examples described herein, where asserting the SLP_S0# signal further includes using legacy SLP_S0# entry checks when no SLP_S0# policy is selected.

Example 34 is an apparatus including a procedure to perform a method as identified in any of Example 29-33.

Example 35 is a machine-readable storage including machine-readable instructions, which, when executed, implement a method or realize an apparatus as identified in any of Examples 29-33.

Example 36 is a machine-readable medium including code, which, when executed, cause the machine to perform the method of any one of Examples 29-33.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present embodiments may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skill in the art will appreciate that many changes may be made to the details of the above-described embodiments without departing from the underlying principles. The scope of the present description should, therefore, be determined by the following claims.

The invention claimed is:

1. A north power controller for transitioning to a low power state comprising:
a processor configured to:
receive a request to transition a computing system to the low power state without latency tolerance;
send a power management message to a south power controller indicating a first time to next timer event (TNTE) when the north power controller will be ready to exit the low power state and an indication to operate without latency tolerance;
receive a response from the south power controller confirming the request to operate without latency tolerance and indicating a second TNTE until the south power controller will be ready to exit the low power state;
transition to the low power state; and
transition to an active state on or before the earlier of the first TNTE and the second TNTE occurs.

2. The north power controller of claim 1, wherein the north power controller is a power control unit (PCU) and the south power controller is a power management controller (PMC).

3. The north power controller of claim 1, wherein the north power controller is fixed hardware, programmable logic or an embedded controller.

4. The north power controller of claim 1, wherein the south power controller is fixed hardware, programmable logic or an embedded controller.

5. The north power controller of claim 1, further comprising a graphics interface and a central processing unit (CPU) interface, both interfaces configured to provide power state information to the north power controller.

6. The north power controller of claim 1, further comprising an operating system interface, the operating system interface configured to provide power state information to the north power controller.

7. The north power controller of claim 1, wherein the north power controller is part of a north bridge and the south power controller is part of a south bridge.

8. The north power controller of claim 1, wherein the request is from an operating system.

9. The north power controller of claim 1, wherein the low power state is a C10 state.

10. The north power controller of claim 1, wherein the latency tolerance is a platform latency tolerance request (PLTR).

11. The north power controller of claim 1, wherein the low power state includes a platform S0ix state.

12. The north power controller of claim 1, wherein the low power state includes a package C10 state.

13. An apparatus of a south power controller, the apparatus comprising:
a processor configured to:
receive a power management message from a north power controller indicating a first time to next timer event (TNTE) when the north power controller will exit a low power state and an indication to operate without latency tolerance;
generate a response to the north power controller confirming the request to operate without latency tolerance and indicating a second TNTE when the south power controller will exit the low power state;
assert a SLP_S0# signal; and
transition to the low power state.

14. The apparatus of claim 13, wherein the indication to operate without latency tolerance further comprises a snoop latency value in a power management request (PMReq) message being set to value representing disabled.

15. The apparatus of claim 13, wherein to assert the SLP_S0# signal further comprises cause a voltage of a SLP_S0# pin of a processor package to be set.

16. The apparatus of claim 13, wherein the north power controller is part of a north bridge and the south power controller is part of a south bridge.

17. The apparatus of claim 13, wherein to assert a SLP_S0# signal further comprises to use test mode forced SLP_S0# entry checks when a test SLP_S0# policy is selected.

18. The apparatus of claim 13, wherein to assert a SLP_S0# signal further comprises to use SLP_S0# entry checks while ignoring latency tolerance requests when a production SLP_S0# policy is selected.

19. The apparatus of claim 13, wherein to assert a SLP_S0# signal further comprises to use legacy SLP_S0# entry checks when no SLP_S0# policy is selected.

20. A non-transitory computer program product comprising a computer-readable storage medium that stores instructions for execution by a processor to perform power management operations of a system on a chip (SoC), the operations, when executed by the processor, to perform a method, the method comprising:

receiving a request to transition the SoC to a low power state with an indicator to ignore latency tolerance;

sending a power management message to a south power controller indicating a first time to next timer event (TNTE) when a north power controller will be ready for the low power state and an indication to operate without latency tolerance;

receiving a response from the south power controller confirming the request to operate without latency tolerance and indicating a second TNTE until the south power controller will be ready for the low power state; and on or after a later of the first and the second time occurs, transitioning to the low power state.

21. The non-transitory computer program product of claim 20, wherein the method further comprises:

receiving the power management message from the north power controller indicating the first time to next timer event (TNTE) when the north power controller will be ready for the low power state and the indication to operate without latency tolerance;

generating a response to the north power controller confirming the request to operate without latency tolerance and the second TNTE until the south power controller will be ready for the low power state; and on or after the later of the first and the second time occurs, asserting a SLP_S0# signal; and transitioning to the low power state.

22. The non-transitory computer program product of claim 21, wherein the north power controller is part of a north bridge and the south power controller is part of a south bridge.

23. The non-transitory computer program product of claim 21, wherein the method further comprises receiving an indication of a low power state from a graphics interface and a central processing unit (CPU) interface.

24. The non-transitory computer program product of claim 20, wherein the method further comprising receiving an indication of power state information from an operating system interface, the operating system interface configured to provide power state information to the north power controller.

* * * * *